(12) United States Patent
Mohnot et al.

(10) Patent No.: US 7,253,224 B2
(45) Date of Patent: Aug. 7, 2007

(54) SILICA-BASED PARTICULATES

(75) Inventors: Shantilal M. Mohnot, Murrysville, PA (US); Harold E. Swift, Gibsonia, PA (US); James T. Dew, Sulphur, LA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 37 days.

(21) Appl. No.: 10/208,863

(22) Filed: Aug. 1, 2002

(65) Prior Publication Data

US 2003/0114542 A1 Jun. 19, 2003

Related U.S. Application Data

(60) Provisional application No. 60/310,609, filed on Aug. 7, 2001.

(51) Int. Cl.
*C08K 5/09* (2006.01)
*C08K 5/34* (2006.01)
*C08K 3/36* (2006.01)

(52) U.S. Cl. .................. 524/284; 524/492; 524/493; 523/220

(58) Field of Classification Search ............. 516/113; 423/339; 524/492, 284, 493; 523/220
See application file for complete search history.

(56) References Cited

U.S. PATENT DOCUMENTS

| | | | | |
|---|---|---|---|---|
| 2,657,149 A | 10/1953 | Iler | | 106/490 |
| 2,940,830 A | 6/1960 | Thornhill | | 423/339 |
| 3,714,068 A | 1/1973 | Miller et al. | | 423/335 |
| 4,038,220 A | 7/1977 | Thompson | | 252/299.5 |
| 4,256,682 A * | 3/1981 | Denton | | 502/232 |
| 4,344,858 A | 8/1982 | Zucker et al. | | 516/116 |
| 4,377,493 A | 3/1983 | Boylan et al. | | 516/117 |
| 4,495,167 A | 1/1985 | Nauroth et al. | | 423/339 |
| 4,617,294 A | 10/1986 | Krivak et al. | | 514/52 |
| 4,681,750 A | 7/1987 | Johnson et al. | | 423/339 |
| 4,717,561 A | 1/1988 | Krivak et al. | | 423/335 |
| 5,094,829 A | 3/1992 | Krivak et al. | | 423/339 |
| 5,104,221 A | 4/1992 | Bott et al. | | 356/336 |
| 5,298,539 A | 3/1994 | Singh et al. | | 524/92 |
| 5,321,070 A * | 6/1994 | Meier et al. | | 524/493 |
| 5,403,570 A | 4/1995 | Chevallier et al. | | 423/339 |
| 5,587,416 A * | 12/1996 | Chevallier et al. | | 524/492 |
| 5,776,240 A | 7/1998 | Deller et al. | | 106/482 |
| 5,792,805 A * | 8/1998 | Williams | | 524/100 |
| 5,858,909 A * | 1/1999 | Welsh et al. | | 502/243 |
| 5,891,938 A | 4/1999 | Williams | | 524/100 |
| 5,906,843 A | 5/1999 | Dew et al. | | 426/2 |
| 6,107,226 A | 8/2000 | Chevallier | | 501/133 |
| 6,191,122 B1 | 2/2001 | Lux et al. | | 514/122 |
| 6,686,418 B2 * | 2/2004 | Wallenwein et al. | | 525/135 |

FOREIGN PATENT DOCUMENTS

| WO | WO 96/40827 | 12/1996 |
|---|---|---|
| WO | WO 99/29623 | 6/1999 |
| WO | WO 01/12715 A1 | 2/2001 |
| WO | WO 01/12730 A1 | 2/2001 |
| WO | WO 01/12731 A1 | 2/2001 |
| WO | WO 01/12732 A1 | 2/2001 |
| WO | WO 01/12733 A1 | 2/2001 |
| WO | WO 01/12734 A1 | 2/2001 |

OTHER PUBLICATIONS

Perkasil® SM series, www online @ http://www.gracedavison.com/eusilica/Precipitated/non-rubber_mid_ppt.htm., pp. 1-2 (May 2006).*
A. Peterson et al., "Resorcinol Bonding Systems for Steel Cord Adhesion," Rubber World (Aug. 1984), pp. 24-27.
Hoff, C., "Wire adhesion—a review of present day technology and a look to the future", ACS Rubber Division Meeting, Cleveland, Ohio, Oct. 21-24, 1997, month unknown.
R. E. Patterson, "The Colloid Chemistry of Silica: Preparation and uses of silica gels and precipitated silicas", 1994, American Chemical Society, pp. 617-626, month unknown.
Paj, vol. 014, No. 006 (M-916) and JP 01-255580 A (OJI Paper Co LTD), Oct. 12, 1989, abstract.

* cited by examiner

*Primary Examiner*—Daniel S. Metzmaier
(74) *Attorney, Agent, or Firm*—Deborah M. Altman; Carol A. Marmo

(57) ABSTRACT

A silica-based particulate material that may contain less than 5 wt. % of a multivalent cation and a method of preparing such a silica-based particulate material. The silica-based particulate material may be characterized as having a median particle size of at least 20 μm, a BET surface area of at least 90 m$^2$/g, and a pH of at least 9.5; or as having a median particle size of up to 20 μm and a pH of at least 10. The silica-based particulate material may be used to make hydrophobic silica-based particulates, which may be characterized as having a pH of at least 10.5.

13 Claims, No Drawings

SILICA-BASED PARTICULATES

CROSS-REFERENCE TO RELATED APPLICATIONS

This application claims priority from U.S. Provisional Patent Application Ser. No. 60/310,609 filed Aug. 7, 2001 and entitled "Silica-Based Particulates," which is herein incorporated by reference.

BACKGROUND OF THE INVENTION

1. Field of the Invention

This invention relates to substantially dry, precipitated silica-based particulates, and especially to such particulates wherein the particle size ranges from fine micronized particles to unmilled small beads. The invention also relates to a process for the preparation of such precipitated silica-based particulates.

2. Description of the Prior Art

It is known in the art to use silica-based particulates having larger particle sizes as carriers for organic liquids such as liquid organic additives for rubber. It is also known in the art to use silica-based particulates having smaller particle sizes in defoamer applications.

Silica-based particulates are useful as carriers for organic liquids because the organic liquid may be absorbed by the silica and the combination thereafter handled as a free-flowing powder.

Silica-based particulates have varying capacities for organic liquids. The carrying capacity may be regarded as approximately the maximum amount of organic liquid that may be absorbed by the silica such that the resulting mixture retains the characteristics of a free-flowing powder. As the silica-based particulates absorb an organic liquid, the mixture changes from a free-flowing form to one of a semiplastic agglomeration, with an accompanying increase in viscosity. It will be appreciated that the carrying capacity of a silica for a particular organic liquid depends upon the characteristics and properties of both the silica and the liquid.

Silica-based particulates are commonly employed as carriers of liquid chemicals and resins, which are used in producing rubber articles. For example, Hi-Sil 233 silica, which is commercially available from PPG Industries, Incorporated, is used as a carrier product to absorb a wire adhesion promoter resin referred to as HMMM (hexamethoxymethyl melamine). This resin is commercially available as Cyrez CRA 963 from Cytec Industries, Incorporated and is used in the manufacture of tires.

It is known in the art to use resorcinol with resins such as HMMM in rubber applications. For instance, Cyrez CRA 963 generally requires the use of a donor acceptor, such as resorcinol, to crosslink the resin with the silica in a rubber application. However, there are health and safety concerns associated with the use of resorcinol. U.S. Pat. No. 5,321,070 is directed to a mixture including resorcinol and silica which exhibits limited sublimation behavior with regard to resorcinol. This reference states that the problems and health risks associated with resorcinol are due to the presence of sublimating resorcinol. Thus, the reference discloses the use of resorcinol precondensates to limit the sublimation of resorcinol.

Further, resorcinol-free vulcanizable rubber compositions are known. For example, U.S. Pat. No. 5,298,539 discloses vulcanizable rubber compositions containing uncured rubber, a vulcanizing agent and at least one additive selected from the group consisting of derivatives of melamine, acetoguanamine, benzoguanamine, cyclohexylguanamine and glycoluril monomer and oligomers of these monomers.

Another manner of eliminating resorcinol from vulcanizable rubber compositions has relied on the use of alternative co-reactants. U.S. Pat. No. 4,038,220 describes a vulcanizable rubber composition which comprises a rubber, a filler material, N-(substituted oxymethyl)melamine and at least one of $\alpha$- or $\beta$-naphthol. This reference employs the monohydric phenols, $\alpha$- or $\beta$-naphthol, as methylene acceptors in the resin forming reaction during vulcanization in the absence of resorcinol.

The use of resorcinol-formaldehyde resin to replace resorcinol in vulcanizable rubber compositions is also known. A. Peterson, et. al., "Resorcinol Bonding Systems for Steel Cord Adhesion," Rubber World (August 1984). Further, U.S. Pat. No. 5,891,938 is directed to a vulcanizable rubber composition containing a high imino alkylated triazine resin additive without the use of resorcinol or resorcinol equivalent co-reactants.

Single component resins typically do not require the presence of resorcinol. However, single component resins are generally incompatible with silica particulates. For example, it has been demonstrated that Cyrez CRA 138L (which is commercially available from Cytec Industries, Incorporated) is incompatible with PPG's silica product known commercially as Hi-Sil SC 72C and Rhodia's silica product known commercially as Zeosil 1165. When Cyrez CRA 138L was imbibed in Hi-Sil SC 72C silica and aged, the resin polymerized and formed hard beads. Such hard beads are typically non-dispersible and, therefore, undesirable for use in the process of making rubber products such as tires. In theory, it is believed that the resultant hard beads were due to crosslinking of the single component resin.

As stated above, it is known in the art to use silica-based particulates having smaller particle sizes in defoamer applications. Typically, silica-based particulates used in defoamer applications are hydrophobic, or at least partially hydrophobic precipitated silica. Examples of such hydrophobic and partially hydrophobic precipitated silica particles are disclosed in U.S. Pat. Nos. 6,191,122, 4,377,493 and 4,344,858.

Additionally, silica-based particulates often contain multivalent cations, such as calcium, magnesium and aluminum. Nonlimiting examples of such materials include aluminosilicates such as Zeolex 23A, which contains 9 wt. % Al as $Al_2O_3$ available from J.M Huber Corporation; and the calcium silicates available as Hubersorb 600, which contains 26 wt. % calcium as CaO, available from J.M Huber Corporation and Sipernat 880, which contains 6 wt. % calcium as CaO available from Degussa AG.

Oftentimes, the multivalent cations can be leached from the silica-based particulates, leading to undesirable interactions between the multivalent cations and the other components of the system or composition to which the silica-based particulates have been added. As a non-limiting example, fatty acid salts of multivalent cations often become insoluble in aqueous systems.

It would be desirable to develop silica particulates that do not require the presence of resorcinol and/or are substantially free of multivalent cations.

SUMMARY OF THE INVENTION

The present invention is directed to a silica-based particulate material and a method of preparing such a silica-based particulate material. The silica-based particulate material is characterized as having a median particle size of at least 20 μm, a BET surface area of at least 90 m²/g, and a pH of at least 9.5, and may contain less than 5 wt. % of a multivalent cation, based on the oxide of the cation. Such larger particle size silicas may be used, for example, as carriers or in carrier compositions.

The present invention is further directed to a hydrophilic silica-based particulate material containing less than 5 wt. % of a multivalent cation, based on the oxide of the cation and a method of preparing such a silica-based particulate material. The silica-based particulate material is characterized as having a median particle size of up to 20 μm and a pH of at least 10. Such smaller particle size silicas have excellent compatibility in a large number of systems.

The present invention is additionally directed to a method of making the silica-based particulates described above hydrophobic as well as being directed to a hydrophobic silica-based particulate characterized as having a pH of at least 10.5. Such hydrophobic silicas may be used, as a non-limiting example, in defoamer compositions and applications.

DETAILED DESCRIPTION OF THE INVENTION

All numbers or expressions, such as those expressing structural dimensions, pressures, flow rates, etc., used in the specification and examples are to be understood as modified in all instances by the term "about," unless otherwise indicated.

As used herein and in the claims, "silica," "silica particulate," "silica-based particulate" or "silica-based particulate material" is intended to refer to any water-insoluble solid obtained by precipitation from a liquid, with or without preliminary or subsequent treatment, and essentially comprising a mixture of substances selected from the group consisting of silicic acids, silica and the silicates or any admixtures thereof, or any combination of such mixtures and admixtures with a wide variety of metallic salts; especially noteworthy are the silicas and silicates. In all instances referring to silica, the silica may be a precipitated silica.

As used herein and in the claims the term "multivalent cation" refers to materials capable of carrying a positive ionic charge of +2 or greater. Nonlimiting examples of "multivalent cationic" materials include those appearing in Group II and Group III in the Periodic Table of the Elements. Specific, nonlimiting examples of "multivalent cationic" materials referred to herein include magnesium, calcium, strontium, barium, boron and aluminum.

The silica-based particulates of the present invention may contain multivalent cationic materials as an impurity or otherwise as an undesired byproduct of the manufacture process. The present silica-based particulates may contain less than 5 wt. %, in some cases not more than 4 wt. %, in other cases not more than 3 wt. %, in some instances not more than 2.5 wt. %, in other instances not more than 2 wt. %, in some situations not more than 1 wt. % in other situations not more than 0.5 wt. % and in selected situations not more than 0.1 wt. % of a multivalent cation. Any single multivalent cation may be present in the present silica-based particulates at any of the levels recited above. Additionally, any combinations of multivalent cationic materials may be present in the present silica-based particulates at any of the levels recited above.

As used herein and in the claims the term "hydrophilic", when used to describe silica-based particulates, refers to silica-based particulates having a methanol wetability of less than 10 wt. %.

As used herein the term "hydrophobic", when used to describe silica-based particulates, refers to silica-based particulates having a methanol wetability of greater than 50 wt. %. Typically, hydrophobic silica is made by chemical reaction of materials such as silicones or silanes with silica-based particulates. In order for silica to become hydrophobic (water repellency as characterized by floatation on water), it requires sufficient organic material to cover the surface of silica. That amount is generally greater than 0.5 wt. % organic carbon content. Silica-based particulates having a methanol wetability of between 10 wt. % and 50 wt. % are termed "partially hydrophobic."

Methanol wetability is a measure of how hydrophobic a silica is. In the method, silicas are wetted using a methanol/water mixture. The proportion of methanol in the mixture, expressed in percent by weight, is a measure of the water-repellence of the modified silica. The higher the proportion of methanol, the better the substance is hydrophobized.

Typically, a silica sample is subjected to various concentrations of methanol/water mixtures prepared in 5% methanol increments. Each silica sample is weighed into individual glass vials and placed separately before a particular range of methanol/water mixtures. Each vial then receives 8 ml of the respective methanol/water mixture, the vial is shaken vigorously and allowed to stand motionless for 30 minutes. The silica-methanol/water mixtures are then observed to determine if wetting has taken place. Typically, wetting is not deemed to occur at a given methanol/water ratio if all of the silica is floating and the methanol/water is not cloudy or most of the silica is floating on a cloudy lower layer. Trace amounts of silica may be found at the bottom of the vial. Wetting is deemed to occur at a given methanol/water ratio when most of the silica is wetted, but trace amounts are still floating, no silica is floating, but no clear upper layer of methanol/water is observed, or all of the silica is wetted and a clear methanol/water layer is observed on top of the silica. Methanol wetability is reported in wt. % methanol of the first methanol/water mixture ratio that shows that wetting has taken place. Methanol wetability is described in more detail in the examples.

The "median particle size" as used herein and in the claims relative to the silica-based particulate material refers to the size as measured by a laser diffraction-based method for which there are many commercial instrument suppliers. A Beckman Coulter Inc. (Hialeah, Fla.) model LS 230 was used in the present invention. The procedure recommended by the instrument supplier was followed. Generally, the particle size distribution of silica dispersed in deionized water was determined using a laser with a wavelength of 750 nm to size particles with diameters from 0.04 μm to 2000 μm. The particles scatter the light in patterns determined by their sizes, and arrays of photodetectors detect and measure the scattered light. The photodetectors are scanned and their outputs converted to digital values which are transmitted to a computer. Further information regarding the particle size measurement can be found in U.S. Pat. No. 5,104,221, which is herein incorporated by reference. Unless otherwise stated, all references to particle size are meant to refer to median particle size as explained above.

The surface area of the silica-based particulates described herein is referred to as "a BET surface area." As used herein and in the claims, "a BET surface area" is the surface area of the substantially dry free-flowing silica-based particulates determined by the Brunauer, Emmett, Teller (BET) method according to ASTM C 819-77 using nitrogen as the adsorbate, but modified by outgassing the system and the sample for one hour at 180° C.

The BET surface area of the present silica-based particulate material will be at least 20 m$^2$/g, in some cases at least 30 m$^2$/g, in other cases at least 50 m$^2$/g, in some instances at least 75 m$^2$/g, in other instance at least 90 m$^2$/g, in some situations at least 100 m$^2$/g, in other situations at least 125 m$^2$/g, in some applications at least 150 m$^2$/g, in other applications at least 175 m$^2$/g and in certain applications at least 200 m$^2$/g. The particular BET surface area for the silica-based particulate material will vary depending on the intended use. The BET surface area of the silica-based particulate material may vary between any number or range of numbers recited above.

A silica-based particulate material has been found which is compatible with liquid organic additives for rubber and single component resins. The median particle size ranges from fine micronized particles to unmilled small beads. The median particle size of the particulate may depend upon the application for use. For example, a micronized silica having a median size of less than 20 μm, in some cases less than 10 μm may be suitable for defoaming applications, whereas a larger median particle size of greater than 10 μm, in some cases greater than 20 μm or even greater may be employed in liquid carrier applications due to the free-flow nature, bulk density and handling characteristics required. In an embodiment of the present invention, a larger median particle size of from 10 to 100 μm or greater than 100 μm, or greater than 150 μm may also be useful in liquid carrier applications.

As used herein and in the claims, "additives for rubber" refers to chemicals and other materials used in rubber processing. Such chemicals and other materials include, but are not limited to petroleum waxes, antioxidants, antiozonants, accelerants, activators, processing oils as well as resins, such as a single component resin that may be adsorbed onto the surface of the silica-based particulate material or absorbed by the silica-based particulate material. As such, the present invention is directed to silica-rubber additive compositions that include an additive for rubber and the present silica-based particulate material.

As is readily seen from the discussion above, the median particle size of the silica-based particulate material may be up to 500 μm, in some cases up to 400 μm, in other cases up to 300 μm, in some instances up to 250 μm, in other instances up to 200 μm and in certain situations up to 150 μm, in other situations up to 100 μm, while some applications will require median particle sizes of up to 50 μm, up to 40 μm, up to 30 μm, up to 20 μm and in applications requiring fine silica-based particulate material, up to 10 μm. Additionally, the median particle size of the silica-based particulate material may be at least 1 μm, in some cases at least 5 μm, in other cases at least 10 μm, in still other cases at least 20 μm, in some instances at least 30 μm, in other instances at least 50 μm, while some applications will require median particle sizes of at least 75 μm, at least 100 μm, at least 120 μm, at least 140 μm and in applications requiring course fine silica-based particulate material, at least 150 μm. The particular range of median particle sizes for the silica-based particulate material will vary depending on the intended use. The median particle size of the silica-based particulate material may vary between any number or range of numbers recited above.

As used herein and in the claims, "single component resin" refers to a self-condensing resin. Examples of self-condensing resins include, but are not limited to HMMM and melamine resins. Self-condensing melamines are known in the art. Self-condensing melamines include a liquid additive comprising a self-condensing alkylated triazine resin having at least one of imino or methylol functionality wherein the self-condensing alkylated triazine resin is (i) a self-condensing alkylated triazine resin having at least one of imino or methylol functionality and represented by the formula (I):

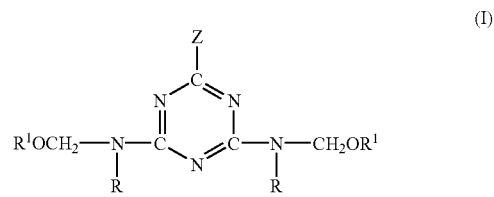

(ii) an oligomer of (i), or
(iii) a mixture of (i) and (ii), wherein
Z is —N(R)(CH$_2$OR$^1$), aryl having 6 to 10 carbon atoms alkyl having 1 to 20 carbon atoms or an acetyl group;
each R is independently hydrogen or —CH$_2$OR$^1$; and
each R$^1$ is independently hydrogen or an alkyl group having 1 to 12 carbon atoms;

provided that at least one R is hydrogen or —CH$_2$OH and at least one R$^1$ is selected from the alkyl group.

In an embodiment of the invention, silica-based particulate materials are comprised of precipitated silica in the form of solid pellets or beads.

A silica used in the present invention may be generally produced by reacting an alkali metal silicate such as sodium silicate, with a suitable acid such as sulfuric acid, hydrochloric acid, and/or carbon dioxide, in the presence of water. The reaction product comprises a silica slurry. The slurry may be dried using a drying technique known in the art. In an embodiment, the slurry may be filtered, washed with water to reduce the concentration of alkali metal salt by-product, filtered and reslurried either by agitation of the filter cake alone or by agitation accompanied by the addition of water.

Any known silica may be used in the present invention. For example, silica and methods for its preparation are described in U.S. Pat. Nos. 2,657,149; 2,940,830; 4,495,167; 4,617,294; 4,681,750; 4,717,561; and 5,094,829; and International Application Serial Nos. WO 01/12730 A1; WO 01/12731 A1; WO 01/12732 A1; WO 01/12733 A1; WO 01/12734 A1 and WO 01/121715 A1; which are incorporated herein by reference.

In an embodiment of the present invention, the silica-based particulate material is characterized as having a median particle size of at least 20 μm; a BET surface area of at least 90 m$^2$/g; and a pH of at least 9.5. In this embodiment, the silica-based particulate material may include less than 5 wt. % of a multivalent cation based on the oxide of the cation and the median particle size may be from 30 μm to 50 μm, or alternatively from 150 μm to 300 μm. Additionally, in this embodiment, the silica may be a hydrophilic silica. Further, the silica-based particulate material of this embodiment may be used as a carrier or in a carrier that includes the silica-based particulate material.

When the silica-based particulate material of the present invention is used as a carrier or in a carrier composition, the carrier may be characterized by oil absorption.

As used herein and in the claims, "oil absorption" refers to the DBP oil absorption of a statistically large population of particles of substantially dry free-flowing silica-based particulate material determined according to ASTM D 2414-93 modified to use a Type E Absorptometer and dibutyl phthalate as the absorbate. The results are reported as milliliters of DBP per 100 grams of dry silica, i.e., silica corrected for adsorbed water content.

When the silica-based particulate material of the present invention is used as a carrier or in a carrier composition, the carrier will have an oil absorption of greater than 220 ml/100 g, in some cases greater than 235 ml/100 g, in other cases greater than 250 ml/100 g and in some situations greater than 300 ml/100 g. The oil absorption of the silica-based particulate material may vary between any number or range of numbers recited above.

In another embodiment of the present invention, a hydrophilic silica-based particulate material includes less than 5 wt. % of a multivalent cation based on the oxide of the cation, and is characterized as having a median particle size of up to 20 µm and a pH of at least 10. The silica-based particulate material may have a BET surface area of at least 20 $m^2/g$ and the median particle size may be further characterized as being from 1 µm to 20 µm.

In a further embodiment of the present invention, the silica-based particulate material is a hydrophobic silica-based particulate material characterized as having a pH of at least 10.5. The hydrophobic silica-based particulate material may have a median particle size of up to 20 µm and may include less than 5 wt. % of a multivalent cation based on the oxide of the cation. The BET surface area of the hydrophobic silica-based particulate material may be at least 20 $m^2/g$. The hydrophobic silica-based particulate material may be used as part of a defoamer composition.

In an embodiment of the present invention, a precipitated silica is prepared by reacting an aqueous sodium silicate solution containing $Na_2O$ with carbon dioxide to form an alkaline slurry of amorphous precipitated silica. The pH of the slurry is lowered using an appropriate acid and filtered to produce a filter cake. Methods for preparing such precipitated silicas are disclosed in U.S. Pat. No. 5,906,843, which is herein incorporated by reference.

The filter cake has a solids content of about 10 to 20 wt. %, typically 15 wt. %. The filter cake is then mixed with water, typically in a three-stage liquefier, to obtain a pumpable slurry of uniform consistency. The slurry is viscous and has a solids content of 9 to 15 wt. %, typically about 13 wt. %.

An alkali is added to the precipitated silica slurry to increase its pH before, during and/or after the liquefier. The selection of the alkali is not critical; any such alkali known in the art to increase pH may be used. Suitable alkalis include, but are not limited to, sodium silicate, potassium silicate, sodium hydroxide, potassium hydroxide, ammonia and organic amines.

In a further embodiment of the present method of forming a silica-based particulate material, a filter cake that includes silica is provided, to which water and shear are applied to form a silica slurry. An appropriate alkaline material is added to the cake either before, during or after applying water and shear to form an alkaline silica slurry. The silica slurry is dried to form a silica-based particulate material, which may be characterized as having less than 5 wt. % of a multivalent cation, based on the oxide of the cation. This method may be used to provide the hydrophilic silica-based particulate material described above.

The pH of the alkaline slurry and the resulting silica-based particulate material will be at least 9.5, in some cases at least 10, in other cases at least 10.5 and in some instances at least 11. The pH of the alkaline slurry and the resulting silica-based particulate material may be as high as 13, in some cases as high as 12.5, in other cases as high as 12 and in some instances as high as 11.5. The pH of the alkaline slurry and the resulting silica-based particulate material may vary between any of the pH values recited above.

The alkaline silica slurry is dried. The alkaline silica slurry may be dried by a drying process known in the art. Suitable drying processes include, but are not limited to, spray drying, rotary drying and flash drying.

In an embodiment of the present invention, the alkaline silica slurry is dried by spray drying. Generally, spray drying is used for evaporating water from flowing drops of slurry of precipitated silica in substantially concurrently flowing hot gas. In an embodiment of the present invention, the precipitated silica-based particulate material has a pH of 9.5 or greater when the median particle size is 20 µm or greater; and a pH of greater than 10 when the median particle size is less than 20 µm.

In an embodiment of the invention, the precipitated silica-based particulate material is hydrophilic. The reaction of sodium silicate with mineral acid generally produces hydrophilic silica. A hydrophilic silica typically has an organic carbon content less than 0.5 wt. % and in some cases less than 0.3 wt. %. In an embodiment of the present invention, the organic carbon content is less than 0.1 wt. %.

The analytical technique used to determine carbon content in silica is based on a modification of the classical Pregal and Dumas method. An EA 1110 elemental analyzer (CE Elantech, Lakewood, N.J.) with the capability of detecting elements C, H, N and S (carbon, hydrogen, nitrogen and sulfur) is used. The silica sample is held in a lightweight tin capsule and introduced into a vertical quartz tube (CE Elantech), through which helium flows at a constant rate, and maintained at a temperature of 1060° C. When the silica sample is introduced, the helium is enriched with oxygen. Flash combustion occurs primed by oxidation of the container. Quantitative combustion is achieved as the gas mixture passes over the $Cr_2O_3$. Further down the combustion tube, the combustion gases are then passed over copper at 650° C. to remove excess oxygen and reduce the oxides of nitrogen to nitrogen. Then, the gases pass through a chromatographic column of Porpak QS (CE Elantech) at 100° C. The individual components are then separated and eluted as $N_2$—$CO_2$—$H_2O$. The carbon content is calculated from the eluted quantity of $CO_2$.

The silica-based particulate material may be further processed by reducing the particle size of the dried silica-based particulate material to a median particle size of less than 20 µm. Additional steps of adding silicone oil to the dried silica-based particulate material and subjecting the resulting composition to a temperature of from 50° C. to 250° C. for a period of time sufficient for the silicone oil to react with the surface of the dried silica-based particulate material may be carried out to form a hydrophobic silica-based particulate material, which may be the hydrophobic silica-based particulate material described above.

In any event, the hydrophobic silica-based particulate material derived from the process described above may be used in defoamer compositions.

In an embodiment of the present invention, the silica-based particulate material is combined with a single component melamine resin to form a silica/resin composition. The composition typically contains 50% or less of the silica and 50% or greater of the resin. In another embodiment, the composition contains 35% or less of the silica and 65% or greater of the resin. In a further embodiment, the silica-based particulate material of the silica/resin mixture has a median particle size of 20 μm or greater, or from 20 to 100 μm, or greater than 100 μm.

It is intended that the silica-based particulate material of the present invention may be useful as a component in a mixture wherein the mixture contains a material having strong undesirable interactions with acidic sites on the silica surfaces. Generally, such materials would be chemically unstable in the presence of acidic silanols or these materials would irreversibly bind to the silica. Examples of such materials include silanes and silicones, urea-formaldehyde resins, amino-containing resins and other similar materials. The silica of the present invention may be used in various applications such as defoamers, flatting agents for coatings, thickeners, reinforcing fillers, paper coatings, free-flow agents, catalyst binders, inkjet printable papers, synthetic printing sheets and other industrial applications.

The present invention is more particularly described in the following examples, which are intended to be illustrative only since numerous modifications and variations therein will be apparent to those skilled in the art. Unless otherwise specified, all parts and all percentages are by weight.

EXAMPLES 1–6

A 150 cubic meter reactor equipped with an agitator, a steam inlet and a carbon dioxide gas sparger was charged with 114 cubic meters of aqueous sodium silicate solution containing 30.4 grams $Na_2O$ per liter and having a $SiO_2$:$Na_2O$ molar ratio of 3.25. The temperature of the sodium silicate solution was 60° C. With agitation, carbon dioxide was added at 8.8 standard cubic meters per minute for 2 hours, at 6.8 standard cubic meters per minute for 1 hour, and then at 11.3 standard cubic meters per minute for 1 hour (referenced to standard conditions of 0° C. and 760 millimeters of mercury, absolute). The resulting slurry of amorphous precipitated silica had a pH of 9.1. The slurry was fed to a series of three Dorr tanks, where it was washed countercurrently with water. Prior to going into the third Dorr tank, the pH of the slurry was adjusted with hydrochloric acid to 4.1. After being washed in the third Dorr tank, the slurry was filtered using a filter press to produce filter cake.

The resultant filter cake had a solids content of 15.3% by weight. The cake was liquefied using water and shear to produce a uniform and pumpable slurry in a three-stage liquefier. The silica slurry had a solids concentration of 12.8% by weight. Silica having an alkaline pH was prepared by mixing with the liquefied slurry aqueous caustic soda solution (25% by weight caustic soda) in an amount sufficient to attain the desired pH. The reaction mixture was then spray dried using a Niro spray drier and rotary atomization technique. In this spray drying technique, water was evaporated from flowing drops of slurry of precipitated silica in substantially concurrently flowing hot gas.

Example 1, a control sample, contained no alkali. In examples 2 through 6, caustic soda solution was slowly added in an amount sufficient to attain a slurry pH of 9, 9.5, 10.0, 10.5, and 11.0 respectively. The particles of the resultant dried silica powder had a median particle size of 30 μm, as measured by a laser diffraction technique using a Beckman Coulter Inc. model LS 230 as described above, and a moisture content in the range of 3 to 5 wt. % as measured by a moisture balance (model HR 73 from Mettler-Toledo Inc., Columbus, Ohio).

Upon drying, the reported pH of silica was achieved. The starting slurry and dry silica pH values were not different for 9.5 and lower pH silica examples. However, the slurries of pH 11, 10.5 and 10 dried to yield products of pH 10.6, 10.3 and 9.9, respectively.

At room temperature, 100 g of dry silica was transferred into a Hobart Mixer Model N50 having a stainless steel bowl. The bowl was raised 3.2 mm by placing brass washers on the bowl attachment pins. The washers enable the aluminum in-plane blade to be lower in the mixing bowl. The mixer was set to a 64 rpm setting. Added to the silica was 257 g of Cyrez CRA 138L resin liquid (obtained from Cytec Industries Inc, W. Paterson, N.J.) at room temperature, while the agitator blade was rotating, over a period of five (5) minutes. The Cyrez resin had a monomer purity of 80%, correlating to a monomer content of 57.6%. Following addition of the resin liquid, mixing was continued for an additional three (3) minutes. The powder mix product (containing 72 wt. % resin liquid) was aged at 50° C. for three (3) weeks, and the monomer content was evaluated. A polymerization reaction occurred in the powder mix, the progress of which was analyzed by analysis of the monomer content. The following gel permeation chromatography (GPC) procedure was developed for the analysis.

Columns, type PL Gel 50A 4×(300×7.5 mm) (Polymer Laboratories Inc., Amherst, Mass.), were used. Other conditions included a column temperature of 35° C., a 40 RI detector (sensitivity=16, temperature=35° C., scale factor=20), a flow rate of 1.0 ml/min, a mobile phase including non-spectrophotometric grade tetrahydrofuran (THF), stop time of 40 minutes, injection volume of 100 μl, sample preparation of 0.1 gram sample (silica-resin mix)+10 ml THF, and standard prep of 0.05 gram CRA-138L+10 ml THF. From the refractive index peaks, the monomer amount was calculated based on the area under the peaks in the resulting chromatogram, based on a reference sample containing a known amount of the Cyrez resin liquid (57.6% monomeric). The results are shown in Table 1 below:

TABLE 1

| Example No. | Dry silica pH | Initial monomer after 1 day @ 50° C. (wt. %) | Initial monomer after 3 weeks @ 50° C. (wt. %) |
|---|---|---|---|
| 1 | 6.5 | 1.5 | 1.0 |
| 2 | 9 | 30.5 | 2.0 |
| 3 | 9.5 | 48.9 | 3.9 |
| 4 | 9.9 | 50.1 | 17.7 |
| 5 | 10.3 | 54.6 | 30.4 |
| 6 | 10.6 | 54.0 | 37.1 |

The results shown in the above table illustrate that when a silica product having a near neutral pH (i.e., pH of 6.5) is used, the resin polymerizes almost completely. However, as the pH of the silica was increased, the unreacted monomer content increased. It was also observed that the silica mix having a pH of 6.5 felt hard to the touch. The silica/resin mix having a pH of 10.6 was friable.

The data show that the compatibility of example 6 at 50° C., was 93.7% for 1 day and 64.4% for 3 weeks.

The flowability of the silica/resin powder was measured by Angle of Repose. The Angle of Repose (AR) was determined using an apparatus having angle markings and the following conditions. A 100 gram sample of the silica/ resin mixture was dropped from a funnel (4 inch diameter at the top and 0.5 inch at the bottom) from a height of 18 inches. The bottom surface of the apparatus where the mixture falls consists of two pieces so that one side piece can be separated at the center line of the heap of mixture. The other side of the base, containing angle markings and the funnel, is fixed and joint with the rest of the device. The mobile piece is removed gently and firmly. The angle of the newly created surface of heap (of silica/resin mixture) is read on the apparatus with the aid of a straight edge held parallel to the surface.

The angle of repose is measured between 0 and 90 degrees. The lower the AR, the more free flowing the material. Suitable free flowing powder is commonly found to have an AR of from 30 to 40 degrees. An AR of greater than 60 degrees is typically representative of poor flow characteristic.

The angle of repose for Example 6 was 50 degrees, measured one day after the silica/resin mixture was prepared.

EXAMPLE 7

A filter cake and liquefied slurry were prepared using the same procedure as above-described for Examples 1–6. The cake had 15.1% solids by weight and the slurry had 12.5% solids by weight. To this slurry, 25% by weight caustic soda solution was added with gentle agitation over a period of one (1) hour in an amount such that a pH of 10.1 was attained. The slurry was fed to a high-pressure pump, which maintained a slurry feed to the nozzles of a spray dryer. The spray dryer was a cylindrical conical bottom vertical spray dryer (obtained from Bayliss Technologies Inc., Randallstown, Md.) having the capability to dry silica having a median particle size of from 200 to 250 µm. The dried silica had a pH of 10.8, a median particle size of 204 µm and a final moisture content of 3.8%. A silica sample of Hi-Sil SC 72C (PPG Industries, Inc, Pittsburgh, Pa.) having a median particle size of 180, a pH of 6.8 and moisture content of 4.2% was used as a control sample.

Mixtures of Cyrez CRA 138L resin and silica were prepared in the same manner as described in Examples 1–6. The mixtures contained 72% of the resin liquid. The mixture of Example 7 and the control mixture were free flowing one day after they were prepared. The angle of repose of the mixture made with the control silica was 35 degrees, whereas the angle of repose for the Example 7 mixture was 36 degrees. Both mixtures were subjected to a temperature of 50° C. for one (1) week and the monomer content was measured using the same procedure as described in Examples 1–6. The control silica/resin mixture had <2% of monomer present. The Example 7 silica/resin mixture had 84% monomer present. Further, beads of the control sample felt hard and were non-dispersible, but the beads of the Example 7 sample were friable.

EXAMPLE 8

The silica for Example 8 was prepared by the same procedure as in Example 7, with the exception that caustic soda solution was added in an amount such that the pH was 10.2. The silica of Example 8 was used to absorb Cyrez 963 resin. The Example 8 sample contained 72% resin by weight. The silica used in control sample was the same as that used in the control for Example 7 (i.e., Hi-Sil SC 72C). Both the Example 8 mixture and the control mixture had similar flow characteristics one day after they were prepared. The angle of repose values for the Example 8 and control mixtures were 36 and 34 degrees, respectively. Both mixtures were used in a wire adhesion rubber compound and tested for wire adhesion properties. The wire adhesion compound formula and test methods used were the same as those described in a paper entitled "Wire adhesion—a review of present day technology and a look to the future" by Charles Hoff, which was presented at the ACS Rubber Division Meeting held in Cleveland, Ohio on Oct. 21–24, 1999.

The results of wire pull strength for the control and Example 8 silica samples are shown in Table 2 below:

TABLE 2

| Wire Pull force (kN) | Control silica | Silica of example 8 |
|---|---|---|
| Original specimen | 0.50 | 0.62 |
| 90° C.-5 day oven aged | 0.57 | 0.64 |
| 90° C.-5 day 50% RH aged | 0.60 | 0.70 |

EXAMPLES 9–11

The amount of alkali needed to achieve a specific pH of dry silica depends on the silica type as well as its starting pH. The following examples show the range of amounts involved in generating silica samples. Silica was dried from a slurry with a predetermined amount of caustic added to it as described in Examples 1–6. A known volume of 25 wt. % caustic soda solution was added and mixed into 18,144 g of a 13 wt. % solids slurry. The volume of alkali and resultant pH of dry product are noted in Table 3.

TABLE 3

| Example No. | 25% caustic (ml) | dry silica pH |
|---|---|---|
| 9 | 96 | 9.7 |
| 10 | 192 | 10.2 |
| 11 | 288 | 10.8 |

EXAMPLES 12–17

Effect of Silica pH on Hydrophobicity of Treated Silica

Silica was made by adding 25% caustic soda solution to the slurries of Examples 1–6 and drying in a laboratory oven at 110° C. overnight. The dried silica was milled using a 4-inch Orbital Micron Master (Jet Pulverizer Company, Morristown, N.J.) with feed air at 95 psi and grind air at 90 psi. The median particle size of milled silica was less than 10 µm. Different amounts of caustic soda solution were used to generate a variety of pH silicas as shown in Table 5.

20 g of the milled hydrophilic silica was treated with 3 g of silicone oil. The silicone oil (polydimethylsiloxanes trimethylsiloxy terminated) PS 041 (United Chemical Technologies Inc, Bristol, Pa.) was dropped with a syringe on agitated silica using a Waring blender model 1120 (Waring Products Division, New Hartford, Conn.) to obtain a homogeneous mixture. The mixture was treated in an oven at 150° C. for 30 minutes.

The hydrophobicity of the treated silica was characterized by the methanol wetability method, which involves observing a mixture of silica and methanol-water solution. A silica sample was subjected to various concentrations of methanol/water mixtures prepared in 5% methanol increments. Each silica sample was weighed into individual glass vials and placed separately before a particular range of methanol/water mixtures. Each vial then received 8 ml of the respective methanol/water mixture, the vial was shaken vigorously and allowed to stand motionless for 30 minutes. The silica's hydrophobic character will fully evolve into distinct and visually observable physical stages. The methanol-induced wetting stages of silica are found as described in Table 4.

TABLE 4

| | |
|---|---|
| Stage 1) | All floating, no cloudiness. |
| Stage 2) | "Incipient Stage of Wetting": Mostly floating but cloudy lower layer. May be trace amount on bottom. |
| Stage 3) | Some floating, some suspended or on bottom. |
| Advanced Stage 3) | Mostly wetted but trace amount still floating. |
| Stage 4) | None floating but no clear upper layer. |
| Stage 5) | "Complete Wetting": All wetted clear layer on top. |

When a lower stage is indicated for a given wt. % methanol solution with a silica sample and a higher wt. % methanol is required to achieve a given stage with the silica sample, the sample is considered to be more hydrophobic.

The methanol wetability is a measure of how hydrophobic a silica is, and provides data on both the uniformity of the hydrophobizing agent and the degree of hydrophobicity present. The higher the methanol concentration required to reach stage 5, "complete wetting", the more hydrophobic the silica is.

TABLE 5

| Example No. | Silica pH | Methanol where stage 3 begins (wt. %) | Methanol where stage 3 ends (wt. %) | Minimum methanol for advanced stage 3 to begin (wt. %) | Observations for water only liquid |
|---|---|---|---|---|---|
| 12 | 6.7 | 0 | 20 | 25 | Some floating but some suspended or settled (stage 3) |
| 13 | 7.9 | 35 | 45 | 47.5 | Mostly floating but cloudy lower layer, may be trace amount on bottom (stage 2) |
| 14 | 9.1 | 30 | 45 | 47.5 | Mostly floating but cloudy lower layer, may be trace amount on bottom (stage 2) |
| 15 | 9.7 | 30 | 47.5 | 50 | Mostly floating but cloudy lower layer, may be trace amount on bottom (stage 2) |
| 16 | 10.5 | 45 | 52.5 | 55 | Mostly floating but cloudy lower layer, may be trace amount on bottom (stage 2) |
| 17 | 11.0 | 55 | 57.5 | 60 | All floating, no cloudiness (stage 1) |

In Example 17, silica pH 11, all of the silica floated (stage 1). Other samples were not as hydrophobic as this one. A higher number of stage for water implies that the silica is more compatible with water or is less hydrophobic. Also, a higher percent methanol required to reach any particular state indicates a more hydrophobic silica. The data tabulated above clearly show that the hydrophobicity of the silica increases as the pH of silica increased from 9.7 to 10.5 to 11.

EXAMPLES 18–23

Defoaming Efficacy as a Function of Silica pH

The silica samples treated with silicone oil in Examples 12–17 were evaluated for defoaming efficacy. The defoamer formulation consisted of 1 g silicone-oil-treated silica and 19 g light mineral oil (Catalog No. 0121-20 Fisher Scientific, Pittsburgh, Pa.). The ingredients were mixed in a glass vial and shaken vigorously for 30 seconds. The mixture was allowed to sit overnight. Foaming aqueous soap solution was made by using caustic soda, Sparkleen 1 detergent (Catalog No. 04-320 Fisher Scientific, Pittsburgh, Pa.) and Dial hand soap solution (CM-5-84014-01 Dial Corporation, Scottsdale, Ariz.). The concentrations used in the soap solution were 0.01 N NaOH, 1 wt. % Sparkleen and 0.5 wt. % Dial soap.

In a 25 ml graduated stoppered glass cylinder, 15 ml foaming solution and 75 mg of defoamer formulation were added. The graduated cylinder was inverted back and forth 20 times each way manually in 45 seconds, to create a foaming condition. The foam height was observed for each case of silica pH for 1, 5 and 30 minutes as shown in Table 6.

TABLE 6

Foam height, ml at different times since initial foaming

| Example No. | Silica pH before silicone oil treatment | 1 min | 5 min | 30 min |
|---|---|---|---|---|
| 18 | 6.7 | 7.5 | 4.5 | 3.5 |
| 19 | 7.9 | 4.0 | 2.4 | 1.8 |
| 20 | 9.1 | 3.6 | 1.8 | 1.6 |
| 21 | 9.7 | 3.3 | 1.9 | 1.2 |
| 22 | 10.5 | 2.5 | 1.3 | 0.7 |
| 23 | 11.0 | 2.3 | 0.6 | 0.1 |

The data demonstrate the improvement in defoaming performance when a higher pH silica is used to prepare a hydrophobic silica. The improvement in defoaming performance continued above a silica pH of 10.

The invention has been described with reference to the preferred embodiments. Obvious modifications and alterations will occur to others upon reading and understanding the detailed description. It is intended that the invention be construed as including all such modifications and alterations insofar as they come within the scope of appended claims or the equivalents thereof.

We claim:

1. A composition comprising a silica-based particulate material and in a single-component resin comprising self-condensing alkylated triazine resin, said silica-based particulate material characterized as having:
   a median particle size of at least 20 μm;
   a BET surface area of at least 90 $m^2/g$; and
   a pH of at least 9.5,
   wherein said composition is formed in the absence of resorcinol.

2. The composition of claim 1, wherein the silica-based particulate material comprises less than 5 wt. % of a multivalent cation, based on the oxide of said cation.

3. The composition of claim 1, wherein the silica-based particulate material has a median particle size from 30 μm to 50 μm.

4. The composition of claim 1, wherein the silica-based particulate material has a median particle size from 150 μm to 300 μm.

5. The composition of claim 1, wherein the silica-based particulate material comprises a precipitated silica.

6. The composition of claim 1, wherein the silica-based particulate material of comprises a hydrophilic silica.

7. The composition of claim 1, wherein the silica-based particulate material has an oil absorption of greater than 220 ml/100 g.

8. A composition comprising a hydrophilic silica-based particulate material and a single-component resin comprising self-condensing alkylated triazine resin, said hydrophilic silica-based particulate material comprising less than 5 wt. % of a multivalent cation, based on the oxide of said cation, and characterized as having:
   a median particle size of up to 20 μm; and
   a pH of at least 10, wherein said composition is formed in the absence of resorcinol.

9. The composition of claim 8, wherein the silica-based particulate material has a BET surface area of at least 20 $m^2/g$.

10. The composition of claim 8, wherein the silica-based particulate material has a median particle size from 1 μm up to 20 μm.

11. The composition of claim 8, wherein the silica-based particulate material comprises a precipitated silica.

12. The composition of claim 8, wherein the silica-based particulate material comprises less than 2 wt. % of a multivalent cation, based on the oxide of said cation.

13. A composition comprising a silica-based particulate material and a single-component resin comprising self-condensing alkylated triazine resin in the absence of resorcinol, said silica-based particulate material prepared by a method comprising:
   (a) providing a filter cake comprising silica;
   (b) applying water and shear to form a silica slurry;
   (c) adding an alkaline material to the cake before, during or after (b) to form an alkaline silica slurry; and
   (d) drying the silica slurry to form a silica-based particulate material characterized as having:
   a median particle size of at least 20 μm;
   a BET surface area of at least 90 $m^2/g$; and
   a pH of at least 9.5.

* * * * *